United States Patent
Watanabe (10) Patent No.: US 10,698,307 B2
(45) Date of Patent: Jun. 30, 2020

(54) WAVELENGTH CONVERSION DEVICE, LIGHT SOURCE DEVICE, LIGHTING APPARATUS, AND PROJECTION IMAGE DISPLAY APPARATUS

(71) Applicant: PANASONIC INTELLECTUAL PROPERTY MANAGEMENT CO., LTD., Osaka (JP)

(72) Inventor: Kenta Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/221,120

(22) Filed: Dec. 14, 2018

(65) Prior Publication Data

US 2019/0187543 A1 Jun. 20, 2019

(30) Foreign Application Priority Data

Dec. 18, 2017 (JP) ................................. 2017-241515

(51) Int. Cl.
*G03B 21/20* (2006.01)
*F21K 9/64* (2016.01)
(Continued)

(52) U.S. Cl.
CPC .............. *G03B 21/204* (2013.01); *F21K 9/64* (2016.08); *G02B 6/0008* (2013.01);
(Continued)

(58) Field of Classification Search
CPC .. G03B 21/204; G03B 21/208; G02B 6/0008; G02B 27/0955; G02B 27/286;
(Continued)

(56) References Cited

U.S. PATENT DOCUMENTS 8,686,625 B1 * 4/2014 Ashdown ............. H01L 33/504
257/98
2008/0089089 A1 4/2008 Hama et al.
(Continued)

FOREIGN PATENT DOCUMENTS

| JP | 2002-042525 A | 2/2002 |
|---|---|---|
| JP | 2004-179644 A | 6/2004 |
| JP | 2005-277127 A | 10/2005 |
| JP | 4379531 B2 | 10/2009 |
| JP | 2010-287680 A | 12/2010 |

*Primary Examiner* — Isiaka O Akanbi
*Assistant Examiner* — Danell L Owens
(74) *Attorney, Agent, or Firm* — Greenblum & Bernstien, P.L.C.

(57) ABSTRACT

A wavelength conversion device is provided. The wavelength conversion device includes a light-transmissive substrate that includes an incidence surface and an emission surface opposite the incidence surface. The light-transmissive substrate is configured to receive, by the incidence surface, excitation light and emit, from the emission surface, the excitation light. A phosphor layer is configured to emit fluorescent light when excited by the excitation light emitted from the emission surface. The phosphor layer includes a first phosphor layer and a second phosphor layer. The first phosphor layer includes first phosphor particles. The second phosphor layer includes second phosphor particles configured to emit fluorescent light including a peak wavelength longer than a peak wavelength of fluorescent light emitted by the first phosphor particles. The first phosphor layer includes a refractive index different from a refractive index of the second phosphor layer.

13 Claims, 7 Drawing Sheets

(51) Int. Cl.
*G02B 27/09* (2006.01)
*G02B 27/28* (2006.01)
*F21V 8/00* (2006.01)
*H04N 9/31* (2006.01)
*F21Y 115/30* (2016.01)
*F21V 23/02* (2006.01)

(52) U.S. Cl.
CPC ....... *G02B 27/0955* (2013.01); *G02B 27/286* (2013.01); *G03B 21/208* (2013.01); *H04N 9/3161* (2013.01); *F21V 23/023* (2013.01); *F21Y 2115/30* (2016.08)

(58) Field of Classification Search
CPC ..... F21K 9/64; H04N 9/3161; F21Y 2115/30; F21V 23/023
See application file for complete search history.

(56) References Cited

U.S. PATENT DOCUMENTS

| | | | |
|---|---|---|---|
| 2009/0224177 A1* | 9/2009 | Kinomoto | C09K 11/7721 250/484.4 |
| 2012/0068594 A1* | 3/2012 | Ibbetson | H01L 33/501 313/501 |
| 2013/0335709 A1* | 12/2013 | Akiyama | G02B 27/0927 353/20 |
| 2014/0153216 A1* | 6/2014 | Yamanaka | F21V 5/04 362/84 |
| 2014/0264419 A1* | 9/2014 | Kim | H01L 33/504 257/98 |
| 2015/0323711 A1* | 11/2015 | Bessho | G02B 5/0242 349/71 |
| 2016/0373704 A1* | 12/2016 | Akiyama | H04N 9/3152 |
| 2017/0307163 A1* | 10/2017 | Nagasaki | F21S 41/16 |
| 2019/0169496 A1* | 6/2019 | Moon | C09K 11/02 |

* cited by examiner

WAVELENGTH CONVERSION DEVICE, LIGHT SOURCE DEVICE, LIGHTING APPARATUS, AND PROJECTION IMAGE DISPLAY APPARATUS

CROSS REFERENCE TO RELATED APPLICATION

This application claims the benefit of priority of Japanese Patent Application Number 2017-241515 filed on Dec. 18, 2017, the entire content of which is hereby incorporated by reference.

BACKGROUND

1. Technical Field

The present disclosure relates to a wavelength conversion device which emits light upon receiving excitation light. In addition, the present disclosure relates to a light source device, a lighting apparatus, and a projection image display apparatus, which include the above-described wavelength conversion device.

2. Description of the Related Art

A light-emitting device which includes an LED chip and two types of phosphor particles each of which absorbs at least a portion of light emitted by the LED chip and thereby emits fluorescent light having a wavelength longer than a wavelength of the absorbed portion of light is known (see, for example, Japanese Unexamined Patent Application Publication No. 2005-277127).

SUMMARY

With the light-emitting device as described above, there are instances where a portion of fluorescent light emitted by a first phosphor particle that is one of the two types of phosphor particles is absorbed by a second phosphor particle that is the other of the two types of phosphor particles and emits fluorescent light having a peak wavelength longer than a peak wavelength of fluorescent light emitted by the first phosphor particle. This leads to a problem that use efficiency of fluorescent light emitted by the first phosphor particle decreases. Furthermore, such absorption of fluorescent light makes it difficult to implement desired color rendering properties.

The present disclosure provides a wavelength conversion device capable of inhibiting, in a phosphor layer, one phosphor particle from absorbing fluorescent light emitted by another phosphor particle. In addition, the present disclosure provides a light source device, a lighting apparatus, and a projection image display apparatus which include the above-described wavelength conversion device.

A wavelength conversion device according to an aspect of the present disclosure includes: a light-transmissive substrate that includes an incidence surface and an emission surface opposite the incidence surface, the light-transmissive substrate configured to receive, by the incidence surface, excitation light and emit, from the emission surface, the excitation light; and a phosphor layer configured to emit fluorescent light when excited by the excitation light emitted from the emission surface. In the wavelength conversion device, the phosphor layer includes a first phosphor layer and a second phosphor layer, the first phosphor layer including first phosphor particles, the a second phosphor layer including second phosphor particles configured to emit fluorescent light including a peak wavelength longer than a peak wavelength of fluorescent light emitted by the first phosphor particles, and the first phosphor layer includes a refractive index different from a refractive index of the second phosphor layer.

A light source device according to an aspect of the present disclosure includes: the wavelength conversion device; and an excitation light source received by the excitation light that enters the incidence surface.

A lighting apparatus according to an aspect of the present disclosure includes: the light source device; and an optical component that condenses or diffuses light emitted by the light source device.

A projection image display apparatus according to an aspect of the present disclosure includes: the light source device; an imaging element that modulates light emitted by the light source device, and outputs modulated light as an image; and a projection lens that projects the image output by the imaging element.

With the wavelength conversion device, the light source device, the lighting apparatus, and the projection image display apparatus according to the present disclosure, it is possible inhibit, in a phosphor layer, one phosphor particle from absorbing fluorescent light emitted by another phosphor particle.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments of the present disclosure will be described with reference to the Drawings. It should be noted that the embodiments described below each show a general or specific example. Thus, the numerical values, shapes, materials, structural components, the disposition and connection of the structural components, and others described in the following embodiments are mere examples, and do not intend to limit the present disclosure. Furthermore, among the structural components in the following embodiments, structural components not recited in any one of the independent claims are described as arbitrary structural components.

In addition, each diagram is a schematic diagram and not necessarily strictly illustrated. In each of the diagrams, substantially the same structural components are assigned with the same reference signs, and there are instances where redundant descriptions are omitted or simplified.

In addition, there are instances where coordinate axes are illustrated in the diagrams used to describe the following embodiments. A Z-axis direction in the coordinate axes is, for example, the vertical direction, a Z-axis positive side is referred to as the top side (upward), and a Z-axis negative side is referred to as the bottom side (downward). Stated differently, the Z-axis direction is a direction perpendicular to an incidence surface or an emission surface of a substrate included in a wavelength conversion device. Furthermore, an X-axis direction and a Y-axis direction are mutually orthogonal directions in a plane (horizontal plane) perpendicular to the Z axis direction. An X-Y plane is a plane parallel to the incidence surface or the emission surface of the substrate included in the wavelength conversion device. For example, in the following embodiments, the expression "in a plan view" means a view in the Z-axis direction.

Embodiment 1

(Configuration of Wavelength Conversion Device)

Figure 1:
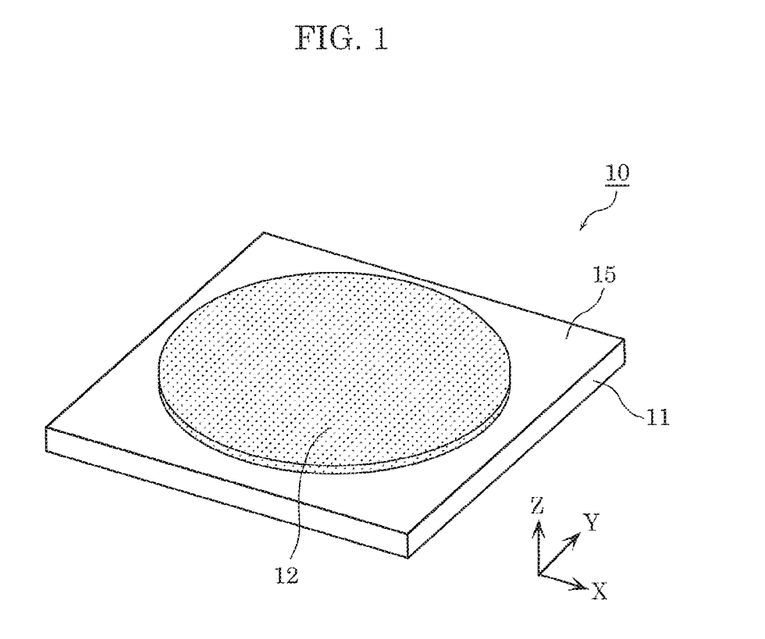
FIG. 1 illustrates an external perspective view of a wavelength conversion device according to Embodiment 1.
Figure 2:
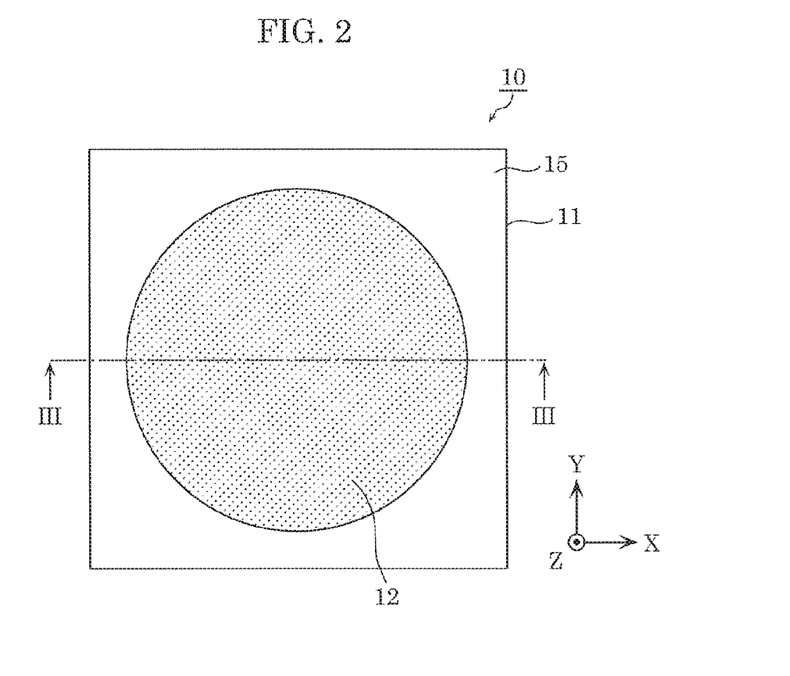
FIG. 2 illustrates a plan view of the wavelength conversion device according to Embodiment 1.
Figure 3:
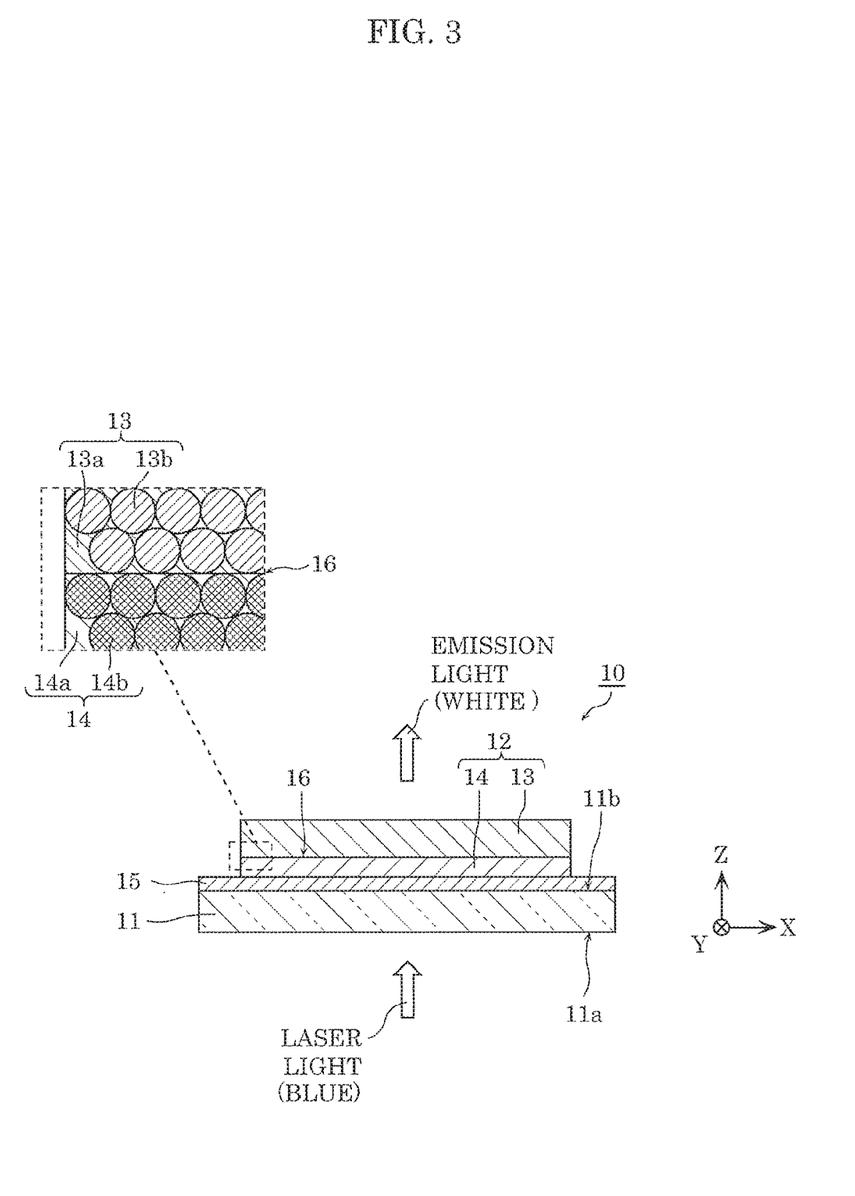
FIG. 3 illustrates a schematic cross-sectional view taken along the line III-III of FIG. 2.

First, a configuration of a wavelength conversion device according to Embodiment 1 will be described with reference to the drawings. FIG. 1 is an external perspective view of the wavelength conversion device according to Embodiment 1. FIG. 2 is a plan view of the wavelength conversion device according to Embodiment 1. FIG. 3 is a schematic cross-sectional view of the wavelength conversion device, taken along the line III-III of FIG. 2. It should be noted that, in FIG. 3, there are instances where a magnitude correlation between the thicknesses of the structural components, for example, is not precisely described.

Wavelength conversion device 10 according to Embodiment 1 illustrated in FIG. 1 to FIG. 3 is a device that emits fluorescent light when excited by excitation light. Specifically, wavelength conversion device 10 includes light-transmissive substrate 11, phosphor layer 12, and optical thin film 15. Phosphor layer 12 has a structure in which first phosphor layer 13 that includes first phosphor particles 13b and second phosphor layer 14 that includes second phosphor particles 14b are layered.

In other words, wavelength conversion device 10 is a light-transmissive phosphor plate, converts a wavelength of a portion of blue laser light emitted by a laser light source, and emits light. Blue laser light is one example of the excitation light. Wavelength conversion device 10 emits white light including blue laser light that passes through phosphor layer 12, yellow fluorescent light emitted by first phosphor particles 13b, and red fluorescent light emitted by second phosphor particles 14b. It should be noted that wavelength conversion device 10 may be a phosphor wheel used in a projection image display apparatus.

Light-transmissive substrate 11 is a substrate formed using a light-transmissive material. Light-transmissive substrate 11 includes incidence surface 11a and emission surface 11b opposite incidence surface 11a, and emits, from emission surface 11b, laser light which enters light-transmissive substrate 11 through incidence surface 11a. Incidence surface 11a is, stated differently, a first main surface on the Z-axis negative side, and emission surface 11b is, stated differently, a second main surface on the Z-axis positive side. Incidence surface 11a and emission surface 11b face the opposite directions. Optical thin film 15 is disposed on emission surface 11b.

Light-transmissive substrate 11 is a sapphire substrate, specifically. Light-transmissive substrate 11 may be any other light-transmissive substrate, such as a light transmissive ceramic substrate formed using polycrystal alumina or aluminum nitride, a transparent glass substrate, a quartz substrate, or a transparent resin substrate. In addition, light-transmissive substrate 11 may have any other shape in a plan view, such as a circular shape.

Optical thin film 15 is a thin film having a property which transmits light of a blue wavelength region, and reflects light of a yellow wavelength region. More specifically, optical thin film 15 has a property that transmits laser light emitted by the laser light source, and reflects fluorescent light emitted by phosphor layer 12. With optical thin film 15, it is possible to increase emission efficiency of wavelength conversion device 10. Optical thin film 15 is, stated differently, a dichroic mirror layer.

Optical thin film 15 is located between emission surface 11b and phosphor layer 12. More specifically, optical thin film 15 is disposed on emission surface 11b, and covers the entirety of emission surface 11b. It should be noted that it is sufficient that optical thin film 15 covers at least a portion of emission surface 11b.

Phosphor layer 12 emits fluorescent light when excited by laser light which is emitted from emission surface 11b and passes through optical thin film 15. Phosphor layer 12 is formed on a portion of optical thin film 15. Although phosphor layer 12 has a circular shape in a plan view, phosphor layer 12 may have any other shape such as a rectangular shape or an annular shape.

Phosphor layer 12 includes, specifically, first phosphor layer 13 and second phosphor layer 14 that is located between first phosphor layer 13 and emission surface 11b.

First phosphor layer 13 is formed on second phosphor layer 14. First phosphor layer 13 includes, specifically, base material 13a and first phosphor particles 13b. First phosphor layer 13 is formed by printing, on second phosphor layer 14, a paste formed using base material 13a including first phosphor particles 13b, for example.

Base material 13a is formed using an inorganic material such as glass, or using an organic-inorganic hybrid material. As described above, since base material 13a includes an inorganic material, it is possible to increase a heat dissipation performance of wavelength conversion device 10. It should be noted that first phosphor layer 13 may be formed by sintering first phosphor particles 13b. In other words, there are instances where first phosphor layer 13 does not include a component corresponding to base material 13a.

First phosphor particles 13b are dispersedly disposed in first phosphor layer 13 (base material 13a), and emits light when excited by blue laser light emitted by the laser light source. In other words, first phosphor particles 13b emit fluorescent light when excited by excitation light. First phosphor particles 13b are, specifically, yttrium-aluminum-garnet (YAG) yellow phosphors such as $Y_3(Al, Ga)_3O_{12}$:Ce phosphors, and emit yellow fluorescent light. It should be noted that first phosphor particles 13b may be lutetium-aluminum-garnet (LuAG) yellow phosphors such as $Lu_3Al_5O_{12}$:Ce phosphors. The yellow phosphor particles are, for example, phosphor particles which emit fluorescent light having a peak wavelength of at least 540 nm and at most 600 nm. First phosphor particles 13b may be LuAG green phosphors or YAG green phosphors. The green phosphor particles are, for example, phosphor particles which emit fluorescent light having a peak wavelength of at least 480 nm and at most 540 nm.

It should be noted that, although the phosphor particles included in first phosphor layer 13 are only first phosphor particles 13b according to Embodiment 1, first phosphor layer 13 may include phosphor particles other than first phosphor particles 13b. First phosphor layer 13 may mainly include first phosphor particles 13b. It is sufficient, for example, that first phosphor particles 13b account for at least half of the phosphor particles included in first phosphor layer 13.

Second phosphor layer 14 is formed on optical thin film 15. When optical thin film 15 is not included in wavelength conversion device 10, second phosphor layer 14 is formed on emission surface 11b of light-transmissive substrate 11. Second phosphor layer 14 includes, specifically, base material 14a and second phosphor particles 14b. Second phosphor layer 14 is formed by printing, on emission surface 11b, a paste formed using base material 14a including second phosphor particles 14b, for example. Second phosphor layer 14 has a thickness smaller than a thickness of first phosphor layer 13, for example.

Base material 14a is formed using an inorganic material such as glass, or using an organic-inorganic hybrid material. As described above, since base material 14a includes an inorganic material, it is possible to increase a heat dissipation performance of wavelength conversion device 10. It should be noted that second phosphor layer 14 may be formed by sintering second phosphor particles 14b. In other words, there are instances where second phosphor layer 14 does not include a component corresponding to base material 14a.

Second phosphor particles 14b are dispersedly disposed in second phosphor layer 14 (base material 14a), and emits light when excited by blue laser light emitted by the laser light source. In other words, second phosphor particles 14b emit fluorescent light when excited by excitation light.

Second phosphor particles 14b emit fluorescent light having a peak wavelength longer than a peak wavelength of fluorescent light emitted by first phosphor particles 13b. Second phosphor particles 14b are, specifically, red phosphor particles such as $CaAlSiN_3$:Eu phosphors, $(Sr,Ca)AlSiN_3$:Eu phosphors, and the like, and emit red fluorescent light. The red phosphor particles are, for example, phosphor particles which emit fluorescent light having a peak wavelength of at least 600 nm and at most 750 nm. As described above, with the red phosphors, it is possible to enhance color rendering properties (specifically, general color rendering index Ra, etc.) of wavelength conversion device 10.

It should be noted that, although the phosphor particles included in second phosphor layer 14 are only second phosphor particles 14b according to Embodiment 1, second phosphor layer 14 may include phosphor particles other than second phosphor particles 14b. Second phosphor layer 14 may mainly include second phosphor particles 14b. It is sufficient, for example, that second phosphor particles 14b account for at least half of the phosphor particles included in second phosphor layer 14.

Most of first phosphor particles 13b included in phosphor layer 12 are directly in contact with other first phosphor particles 13b or second phosphor particles 14b. The same holds true for second phosphor particles 14b. As described above, since such a densely-arranged state of the phosphor particles is held in wavelength conversion device 10, heat generated in one of the phosphor particles is easily conducted to the other phosphor particles. Accordingly, the heat dissipation property is improved.

According to a result of earnest investigation by the inventor, phosphor layer 12 may contain first phosphor particles 13b and second phosphor particles 14b in a total volume of at least 40% relative to base material 13a and base material 14a. Stated differently, when the volume of base material 13a and base material 14a is 100%, a total volume of the phosphor particles included in phosphor layer 12 may be at least 40%. This makes it easy to densely arrange the phosphor particles in phosphor layer 12.

(Inhibiting Absorption of Fluorescent Light)

In general, a phosphor particle emits fluorescent light by absorbing light having a wavelength shorter than a peak wavelength of fluorescent light of the phosphor particle. In wavelength conversion device 10, first phosphor particles 13b do not absorb fluorescent light emitted by second phosphor particles 14b. However, second phosphor particles 14b absorb fluorescent light emitted by first phosphor particles 13b. A human visual sensitivity is higher in the yellow wavelength region than in the red wavelength region. Accordingly, in order to secure the brightness level of white light emitted by wavelength conversion device 10, it is necessary to increase the use efficiency of yellow fluorescent light emitted by first phosphor particles 13b. In other words, it is necessary to inhibit yellow fluorescent light emitted by first phosphor particles 13b from being absorbed by second phosphor particles 14b. Furthermore, desired color rendering properties are made difficult to implement when yellow fluorescent light emitted by first phosphor particles 13b is absorbed by second phosphor particles 14b. It is necessary, also from the perspective of color rendering properties, to inhibit yellow fluorescent light emitted by first phosphor particles 13b from being absorbed by second phosphor particles 14b.

In view of the above, in wavelength conversion device 10, light-transmissive substrate 11 is located closer to second phosphor layer 14 than to first phosphor layer 13. In other words, laser light is emitted to second phosphor layer 14 prior to being emitted to first phosphor layer 13. With this configuration, yellow fluorescent light emitted by first phosphor particles 13b is less likely to enter second phosphor layer 14, and thus yellow fluorescent light emitted by first phosphor particles 13b is inhibited from being absorbed by second phosphor particles 14b.

In addition, in wavelength conversion device 10, first phosphor layer 13 has a refractive index different from a refractive index of second phosphor layer 14. With this configuration, interface 16 is defined between first phosphor layer 13 and second phosphor layer 14, and yellow fluorescent light emitted by first phosphor particles 13b is reflected by interface 16. Accordingly, yellow fluorescent light emitted by first phosphor particles 13b is less likely to enter second phosphor layer 14. Thus, yellow fluorescent light emitted by first phosphor particles 13b is inhibited from being absorbed by second phosphor particles 14b.

As described above, first phosphor layer 13 has a refractive index different from a refractive index of second phosphor layer 14. This means that first phosphor layer 13 has a refractive index substantially different from a refractive index of second phosphor layer 14. For example, this means that refractive index difference $\Delta n$ between first phosphor layer 13 and second phosphor layer 14 is 0.05 or greater. Refractive index difference $\Delta n$ is achieved by, for example, employing different materials for base material 13a of first phosphor layer 13 and for base material 14a of second phosphor layer 14. Refractive index difference $\Delta n$ may be achieved by employing materials which are of the same type but whose compositions or the like are slightly different, for base material 13a of first phosphor layer 13 and base material 14a of second phosphor layer 14.

It should be noted that a refractive index of first phosphor layer 13 represents a refractive index of base material 13a and first phosphor particles 13b as a whole. In the case where base material 13a is not included in first phosphor layer 13, the refractive index of first phosphor particles 13b is the refractive index of first phosphor layer 13. The same holds true for second phosphor layer 14.

The refractive index of first phosphor layer 13 is, for example, lower than a refractive index of second phosphor layer 14. With this configuration, interface 16 is defined between first phosphor layer 13 and second phosphor layer 14, and yellow fluorescent light emitted by first phosphor particles 13b is reflected by interface 16. Accordingly, yellow fluorescent light emitted by first phosphor particles 13b is less likely to enter second phosphor layer 14. Thus, yellow fluorescent light emitted by first phosphor particles 13b is inhibited from being absorbed by second phosphor particles 14b.

The refractive index of first phosphor layer 13 may be higher than the refractive index of second phosphor layer 14. This configuration facilitates total reflection of yellow fluorescent light emitted by first phosphor particles 13b, at interface 16. In addition, even though fluorescent light emitted by first phosphor particles 13b travels in all directions, it is possible to increase a reflectivity at interface 16 for a component of light which is incident on interface 16 at a large incident angle, among the fluorescent light emitted by first phosphor particles 13b, when the refractive index of first phosphor layer 13 is higher than the refractive index of second phosphor layer 14. Thus, yellow fluorescent light emitted by first phosphor particles 13b is inhibited from being absorbed by second phosphor particles 14b.

(Variation)

Figure 4:
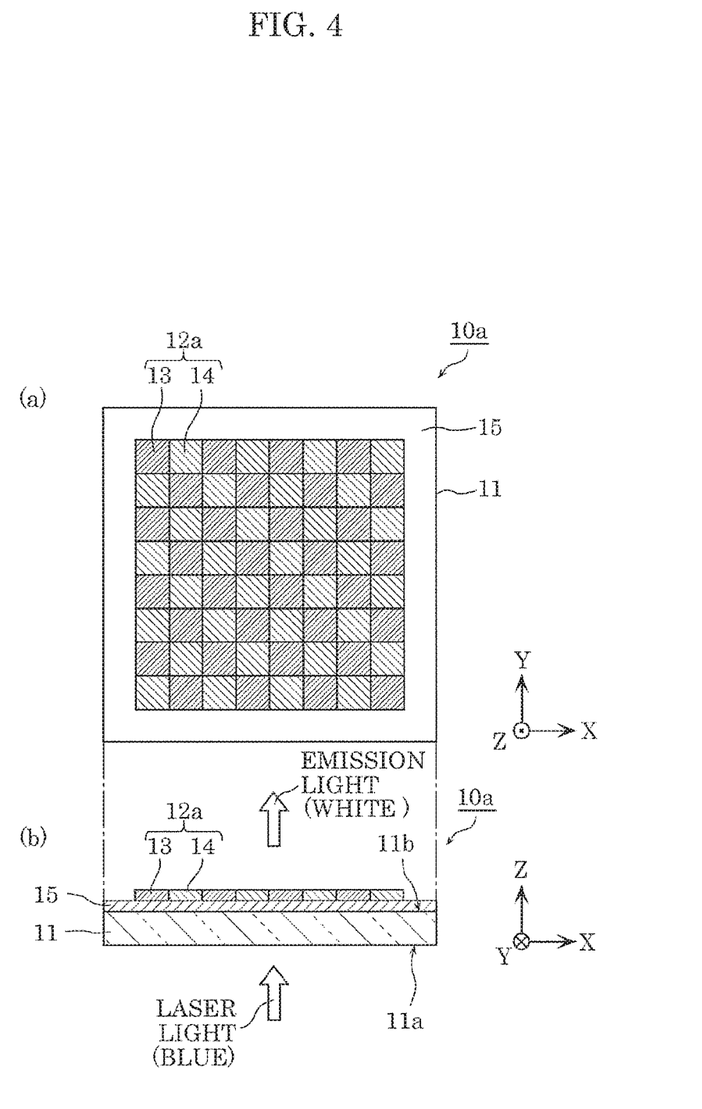
FIG. 4 illustrates a plan view and a schematic cross-sectional view of a wavelength conversion device according to a variation example of Embodiment 1.

In wavelength conversion device 10, second phosphor layer 14 is disposed between first phosphor layer 13 and emission surface 11b. However, first phosphor layer 13 and second phosphor layer 14 may be disposed side by side along emission surface 11b. FIG. 4 illustrates a plan view ((a) in FIG. 4) and a schematic cross-sectional view ((b) in FIG. 4) of a wavelength conversion device according to a variation example of Embodiment 1 described above.

As illustrated in FIG. 4, wavelength conversion device 10a includes, specifically, light-transmissive substrate 11, phosphor layer 12a, and optical thin film 15. Phosphor layer 12a includes a plurality of first phosphor layers 13 and a plurality of second phosphor layers 14. Phosphor layer 12a has a configuration in which the plurality of first phosphor layers 13 and the plurality of second phosphor layers 14 are disposed along emission surface 11b. More specifically, the plurality of first phosphor layers 13 and the plurality of second phosphor layers 14 are disposed on optical thin film 15. It should be noted that it is sufficient that phosphor layer 12a includes at least one first phosphor layer 13 and at least one second phosphor layer 14.

In a plan view, the plurality of first phosphor layers 13 and the plurality of second phosphor layers 14 are arranged in a matrix along emission surface 11b. First phosphor layer 13 and second phosphor layer 14 are alternately disposed in each of the column direction (e.g., the Y direction) and the row direction (e.g., the X direction) in the matrix. In addition, first phosphor layer 13 and second phosphor layer 14 each have a quadrilateral shape, and are laid closely to be in contact with each other.

Also in wavelength conversion device 10a as described above, since first phosphor layer 13 has a refractive index different from a refractive index of phosphor layer 14, an interface is defined between first phosphor layer 13 and second phosphor layer 14, and thus yellow fluorescent light emitted by first phosphor particles 13b included in first phosphor layer 13 is reflected by interface 16. Accordingly, yellow fluorescent light emitted by first phosphor particles 13b is less likely to enter second phosphor layer 14, and thus the yellow fluorescent light emitted by first phosphor particles 13b is inhibited from being absorbed by second phosphor particles 14b. It should be noted that, as with wavelength conversion device 10, the refractive index of first phosphor layer 13 may be lower than the refractive index of second phosphor layer 14, or may b higher than the refractive index of second phosphor layer 14.

In addition, in wavelength conversion device 10a, the interface defined between first phosphor layer 13 and second phosphor layer 14 extends in a direction crossing emission surface 11b. Accordingly, yellow fluorescent light emitted by first phosphor particles 13b and red fluorescent light emitted by second phosphor particles 14b are inhibited from traveling back to light-transmissive substrate 11 by being reflected by the interface. Accordingly, use efficiency of yellow fluorescent light emitted by first phosphor particles 13b and use efficiency of red fluorescent light emitted by second phosphor particles 14b are improved.

It should be noted that the plurality of first phosphor layers 13 and the plurality of second phosphor layers 14 need not be disposed in a matrix. For example, the plurality of first phosphor layers 13 and the plurality of second phosphor layers 14 may be arranged in stripes.

Advantageous Effects, Etc.

As described above, wavelength conversion device 10 includes: light-transmissive substrate 11 that includes incidence surface 11a and emission surface 11b opposite incidence surface 11a, light-transmissive substrate 11 configured to receive, by incidence surface 11a, laser light and emit, from emission surface 11b, the laser light; and phosphor layer 12 configured to emit fluorescent light when excited by the laser light emitted from emission surface 11b. Phosphor layer 12 includes first phosphor layer 13 and second phosphor layer 14, first phosphor layer 13 including first phosphor particles 13b, second phosphor layer 14 including second phosphor particles 14b configured to emit fluorescent light including a peak wavelength longer than a peak wavelength of fluorescent light emitted by first phosphor particles 13b, and first phosphor layer 13 includes a refractive index different from a refractive index of second phosphor layer 14. The laser light is one example of excitation light.

With this configuration, fluorescent light emitted by first phosphor particles 13b is reflected by interface 16 that is defined between first phosphor layer 13 and second phosphor layer 14, and thus the fluorescent light emitted by first phosphor particles 13b is less likely to enter second phosphor layer 14. Accordingly, the fluorescent light emitted by first phosphor particles 13b is inhibited from being absorbed by second phosphor particles 14b.

In addition, for example, second phosphor layer 14 is between first phosphor layer 13 and emission surface 11b.

With this configuration, laser light is emitted to second phosphor layer 14 prior to being emitted to first phosphor layer 13. Since yellow fluorescent light emitted by first phosphor particles 13b is less likely to enter second phosphor layer 14, the yellow fluorescent light emitted by first phosphor particles 13b is inhibited from being absorbed by second phosphor particles 14b.

In addition, laser light is easily transmitted through both first phosphor layer 13 and second phosphor layer 14, and thus color unevenness of emission light is reduced.

In addition, for example, in wavelength conversion device 10a, first phosphor layer 13 and second phosphor layer 14 are disposed side by side along emission surface 11b.

With this configuration, an interface defined between first phosphor layer 13 and second phosphor layer 14 extends in a direction crossing emission surface 11b. Accordingly, yellow fluorescent light emitted by first phosphor particles 13b and red fluorescent light emitted by second phosphor particles 14b are inhibited from traveling back to light-transmissive substrate 11 by being reflected by the interface. Accordingly, use efficiency of yellow fluorescent light emitted by first phosphor particles 13b and use efficiency of red fluorescent light emitted by second phosphor particles 14b are improved.

In addition, in wavelength conversion device 10a, first phosphor layer 13 comprises a plurality of first phosphor layers 13 and second phosphor layer 14 comprises a plurality of second phosphor layers 14. The plurality of first phosphor layers 13 and the plurality of second phosphor layers 14 are disposed in a matrix along emission surface 11b, and the plurality of first phosphor layer 13 and the plurality of second phosphor layer 14 are alternately disposed in each of a column direction and a row direction in the matrix.

With this configuration, color unevenness of emission light of wavelength conversion device 10a is reduced. With increased fineness in the pattern of the matrix, a contacting area of first phosphor layer 13 and second phosphor layer 14 increases. Accordingly, although yellow fluorescent light emitted by first phosphor layer 13 is more likely to be absorbed by second phosphor layer 14, the color unevenness is further reduced.

In addition, for example, the refractive index of first phosphor layer 13 is less than the refractive index of second phosphor layer 14.

With this configuration, interface 16 is defined between first phosphor layer 13 and second phosphor layer 14, and yellow fluorescent light emitted by first phosphor particles 13b is reflected by interface 16. Accordingly, yellow fluorescent light emitted by first phosphor particles 13b is less likely to enter second phosphor layer 14. Thus, yellow fluorescent light emitted by first phosphor particles 13b is inhibited from being absorbed by second phosphor particles 14b.

In addition, for example, the refractive index of first phosphor layer 13 is greater than the refractive index of second phosphor layer 14.

This configuration facilitates total reflection of fluorescent light emitted by first phosphor particles 13b, at interface 16. Accordingly, the fluorescent light emitted by first phosphor particles 13b is less likely to enter second phosphor layer 14. In addition, even though fluorescent light emitted by first phosphor particles 13b travels in all directions, it is possible to increase a reflectivity at interface 16 for a component of light which is incident on interface 16 at a large incident angle, among the fluorescent light emitted by first phosphor particles 13b, when the refractive index of first phosphor layer 13 is higher than the refractive index of second phosphor layer 14. Accordingly, the fluorescent light emitted by first phosphor particles 13b is inhibited from being absorbed by second phosphor particles 14b.

In addition, for example, wavelength conversion device 10 further includes optical thin film 15 between emission surface 11b and second phosphor layer 14. Optical thin film 15 includes a property of transmitting the laser light and reflecting the fluorescent light emitted by phosphor layer 12.

With optical thin film 15 as described above, it is possible to increase emission efficiency of wavelength conversion device 10.

In addition, for example, phosphor layer 12 includes base material 13a and base material 14a, and contains first phosphor particles 13b and second phosphor particles 14b in a volume of at least 40% relative to base material 13a and base material 14a.

This makes it easy to densely arrange the phosphor particles in phosphor layer 12 to enhance heat dissipation performance.

Embodiment 2

(Overall Configuration)

Figure 5:
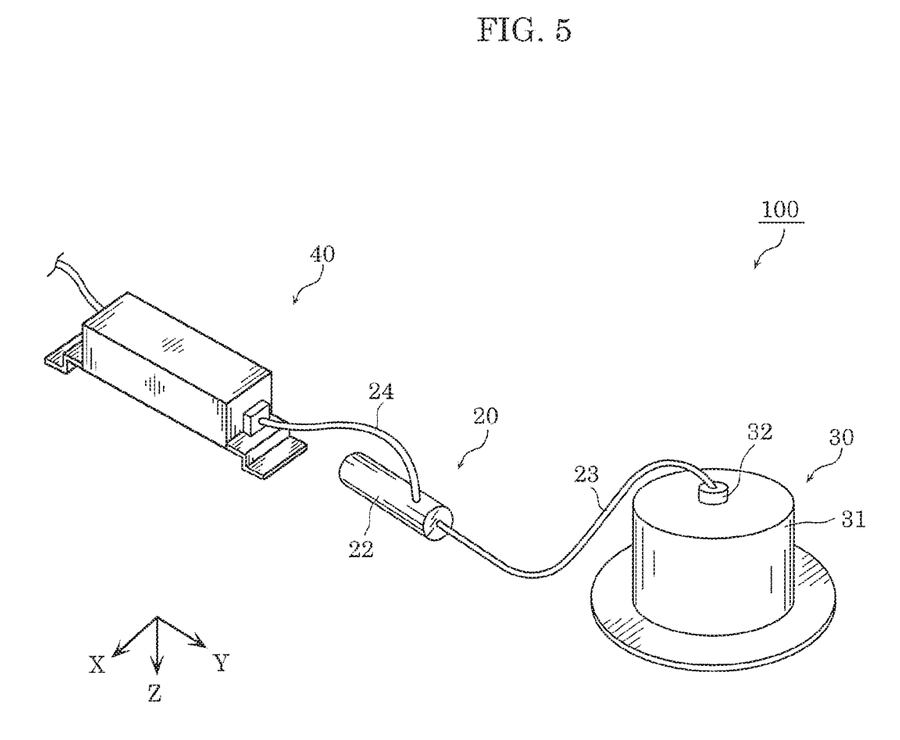
FIG. 5 illustrates an external perspective view of a lighting apparatus according to Embodiment 2.
Figure 6:
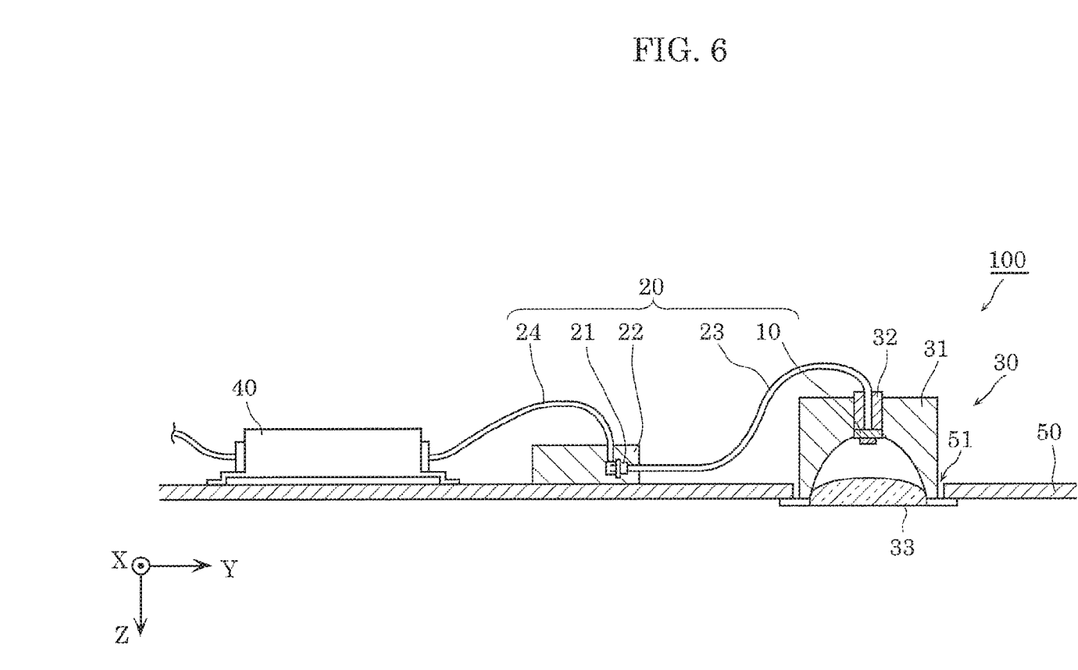
FIG. 6 is a schematic cross-sectional view which illustrates a use mode of the lighting apparatus according to Embodiment 2.

In Embodiment 2, a light source device including wavelength conversion device 10, and a lighting apparatus including the light source device will be described. FIG. 5 is an external perspective view of the lighting apparatus according to Embodiment 2. FIG. 6 is a schematic cross-sectional view which illustrates a use mode of the lighting apparatus according to Embodiment 2. It should be noted that, in FIG. 6, only the illustration of power supply device 40 shows a side surface instead of a cross-section surface.

As illustrated in FIG. 5 and FIG. 6, lighting apparatus 100 is a downlight attached to ceiling 50 of a building. Lighting apparatus 100 includes light source device 20, lighting device 30, and power supply device 40. Light source device 20 and lighting device 30 are optically connected via optical fiber 23. Light source device 20 and power supply device 40 are electrically connected via power supply cable 24.

Lighting apparatus 100 is mounted on ceiling 50 in a state in which lighting device 30 is inserted into opening 51 of ceiling 50. In other words, lighting apparatus 100 is disposed on a back surface of the ceiling except a portion of lighting device 30.

(Light Source Device)

Next, light source device 20 will be described in detail. Light source device 20 includes laser light source 21 which emits blue laser light and wavelength conversion device 10. Light source device 20 emits white light with the combination of laser light source 21 and wavelength conversion device 10. More specifically, light source device 20 emits white light including excitation light (blue laser light) and fluorescent light emitted by phosphor layer 12. Light source device 20 includes laser light source 21, heat sink 22, optical fiber 23, power supply cable 24, and wavelength conversion device 10. It should be noted that light source device 20 may include wavelength conversion device 10a in place of wavelength conversion device 10.

Laser light source 21 is one example of an excitation light source which emits excitation light. Laser light source 21 is, for example, a semiconductor laser which emits blue laser light. The emission peak wavelength (center emission wavelength) of laser light source 21 is, for example, at least 440 nm and at most 470 nm. Laser light source 21 may emit blue-violet light or ultraviolet light. Laser light source 21 is specifically a CAN package element. However, laser light source 21 may be a chip type element.

Heat sink 22 is a structure used for dissipating heat of laser light source 21 that is currently emitting light. Heat sink 22 houses laser light source 21 therein, and also functions as an outer casing of light source device 20. Heat sink 22 is capable of dissipating heat generated in laser light source 21 to heat sink 22. Heat sink 22 is formed using, for example, metal that is relatively high in thermal conductivity, such as aluminum or copper.

Optical fiber 23 guides laser light emitted by laser light source 21 to the outside of heat sink 22. Optical fiber 23 includes an entrance located inside heat sink 22. The laser light emitted by laser light source 21 enters the entrance of optical fiber 23. Optical fiber 23 includes an exit located inside lighting device 30. The laser light that exits through the exit is emitted to wavelength conversion device 10 located inside lighting device 30.

Power supply cable 24 is a cable for supplying, to light source device 20, power supplied from power supply device 40. Power supply cable 24 has one end connected to a power supply circuit in power supply device 40, and the other end connected to laser light source 21 through an opening defined in heat sink 22.

(Lighting Device)

Next, lighting device 30 will be described. Lighting device 30 is fitted to opening 51, and converts a wavelength of laser light guided by optical fiber 23 to emit light of a predetermined color. Lighting device 30 includes casing 31, holder 32, and lens 33.

Casing 31 is a cylindrical component having an open end on the Z-axis positive side and a closed-end on the opposite side, and houses holder 32, wavelength conversion device 10, and lens 33. The outer diameter of casing 31 is slightly smaller than the diameter of opening 51, and casing 31 is fitted to opening 51. Casing 31 is, more specifically, fixed to opening 51 using an attachment spring (not illustrated). Casing 31 is, for example, formed using metal that is relatively high in thermal conductivity, such as aluminum or copper.

Holder 32 is a cylindrical component which holds optical fiber 23, and includes a portion that is housed in casing 31. Holder 32 is disposed on an upper portion of casing 31. Optical fiber 23 is held in a state in which optical fiber 23 is passed through a through hole provided along the center axis of holder 32. Holder 32 holds optical fiber 23 in such a manner that the exit of optical fiber 23 faces the Z-axis positive side (i.e., the exit faces wavelength conversion device 10). Holder 32 is formed using, for example, aluminum, copper, or the like. However, holder 32 may be formed using resin.

Lens 33 is an optical component which is disposed on an exit of casing 31, and controls distribution of light emitted by wavelength conversion device 10. Lens 33 is one example of the optical component which condenses or diffuses white light emitted by light source device 20 (wavelength conversion device 10). Lens 33 has a surface facing wavelength conversion device 10 and having a shape that enables taking light emitted by wavelength conversion device 10 into lens 33 with the leakage as least as possible.

(Power Supply Device)

Next, power supply device 40 will be described. Power supply device 40 is a device which supplies power to light source device 20 (laser light source 21). Power supply device 40 houses a power supply circuit therein. The power supply circuit generates power for causing light source device 20 to emit light, and supplies the generated power to lighting device 30 through power supply cable 24. The power supply circuit is, specifically, an AC/DC converter circuit which converts AC power supplied from a power system into DC power, and outputs the DC power. Accordingly, direct current is supplied to laser light source 21.

Advantageous Effects, Etc., of Embodiment 2

As described above, light source device 20 includes: wavelength conversion device 10; and laser light source 21 which emits laser light that enters incidence surface 11a. Laser light source 21 is one example of an excitation light source, and laser light is one example of excitation light.

With light source device 20 as describe above, fluorescent light emitted by first phosphor particles 13b is reflected by interface 16 that is defined between first phosphor layer 13 and second phosphor layer 14, and thus the fluorescent light emitted by first phosphor particles 13b is less likely to enter second phosphor layer 14. Accordingly, the fluorescent light emitted by first phosphor particles 13b is inhibited from being absorbed by second phosphor particles 14b.

Lighting apparatus 100 includes light source device 20 and lens 33 which collects or diffuses white light emitted by light source device 20. Lens 33 is one example of the optical component.

With lighting apparatus 100 as described above, fluorescent light emitted by first phosphor particles 13b is reflected by interface 16 that is defined between first phosphor layer 13 and second phosphor layer 14, and thus the fluorescent light emitted by first phosphor particles 13b is less likely to enter second phosphor layer 14. Accordingly, the fluorescent light emitted by first phosphor particles 13b is inhibited from being absorbed by second phosphor particles 14b.

Embodiment 3

Figure 7:
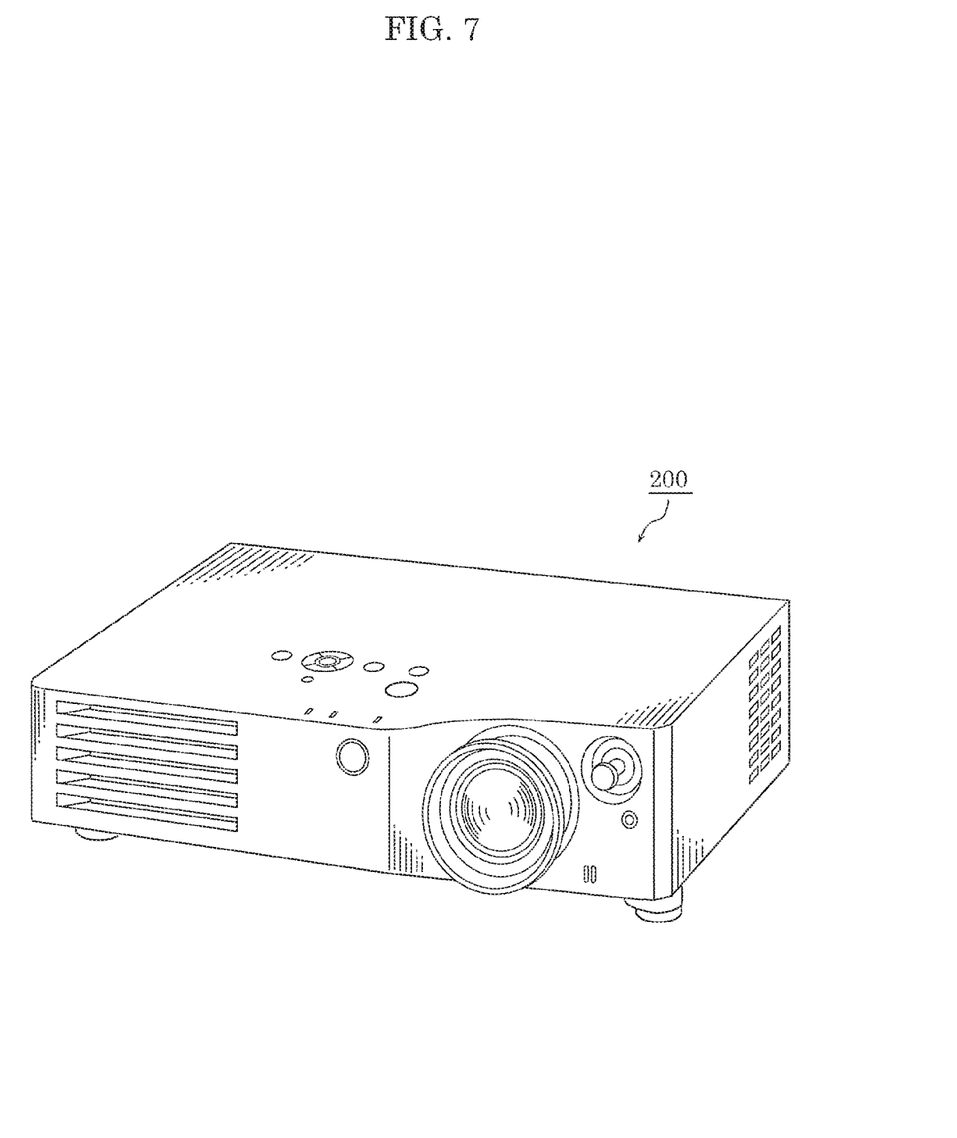
FIG. 7 illustrates an external perspective view of a projection image display apparatus according to Embodiment 3.
Figure 8:
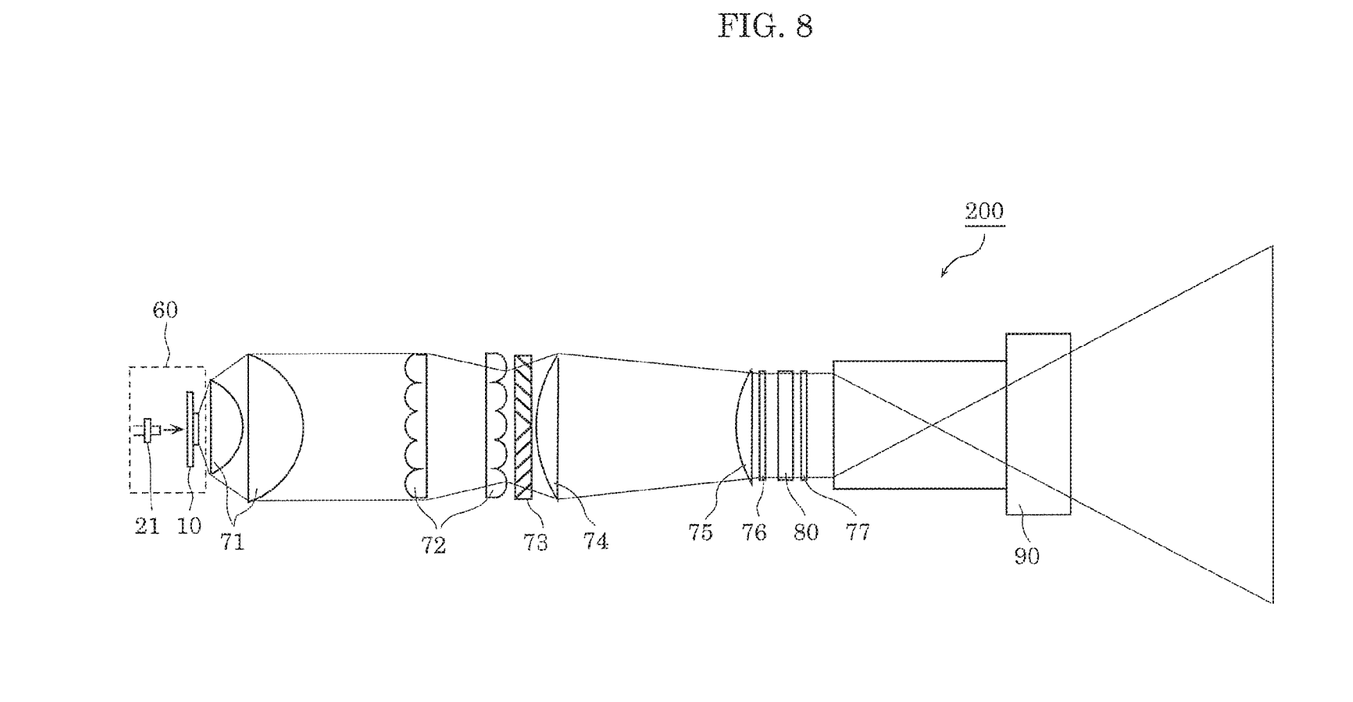
FIG. 8 is a diagram which illustrates an optical system included in the projection image display apparatus according to Embodiment 3.

In Embodiment 3, a light source device including wavelength conversion device 10, and a projection image display apparatus including the light source device will be described. FIG. 7 is an external perspective view of the projection image display apparatus according to Embodiment 3. FIG. 8 is a diagram which illustrates an optical system of the projection image display apparatus according to Embodiment 3.

As illustrated in FIG. 7 and FIG. 8, projection image display apparatus 200 is a single-plate projector. Projection image display apparatus 200 includes light source device 60, collimate lens 71, integrator lens 72, polarized beam splitter 73, condenser lens 74, and collimate lens 75. In addition, projection image display apparatus 200 includes entrance-side polarization element 76, imaging element 80, exit-side polarization element 77, and projection lens 90.

Light source device 60 emits white light including excitation light (blue laser light) and fluorescent light emitted by phosphor layer 12. Light source device 60 includes, specifically, laser light source 21 and wavelength conversion device 10.

White light emitted by light source device 60 is collimated by collimate lens 71, and integrator lens 72 homogenizes an intensity distribution. The light whose intensity distribution is homogenized is converted to linearly polarized light by polarized beam splitter 73. Here, the light whose intensity distribution is homogenized is, for example, converted to p-polarized light.

The p-polarized light is incident on condenser lens 74, further collimated by collimate lens 75, and incident on entrance-side polarization element 76.

Entrance-side polarization element 76 is a polarization plate (polarization control element) which polarizes incident light toward imaging element 80. Exit-side polarization element 77 is a polarization plate which polarizes light that exits imaging element 80. Imaging element 80 is disposed between entrance-side polarization element 76 and exit-side polarization element 77.

Imaging element 80 is a substantially planar element which spatially modulates white light emitted by light source device 60, and outputs the spatially modulated white light as an image. Imaging element 80, stated differently, generates light for an image. Imaging element 80 is, specifically, a transmissive liquid crystal panel.

Since a polarization control region of entrance-side polarization element 76 transmits p-polarized light, light incident on entrance-side polarization element 76 enters imaging element 80, is modulated by imaging element 80, and exits imaging element 80. In addition, unlike entrance-side polarization element 76, exit-side polarization element 77 transmits only s-polarized light. Accordingly, only components of the s-polarized light included in the modulated light are transmitted through the polarization control region of exit-side polarization element 77, and are incident on projection lens 90.

Projection lens 90 projects an image output by imaging element 80. As a result, an image is projected on a screen or the like.

Advantageous Effects, Etc., of Embodiment 3

As described above, projection image display apparatus 200 includes light source device 60, imaging element 80 which modulates white light emitted by light source device 60 and outputs modulated white light as an image, and projection lens 90 which projects the image output by imaging element 80.

With projection image display apparatus 200 as described above, fluorescent light emitted by first phosphor particles 13b is reflected by interface 16 that is defined between first phosphor layer 13 and second phosphor layer 14, and thus the fluorescent light emitted by first phosphor particles 13b is less likely to enter second phosphor layer 14. Accordingly, the fluorescent light emitted by first phosphor particles 13b is inhibited from being absorbed by second phosphor particles 14b.

It should be noted that the optical system of projection image display apparatus 200 described in Embodiment 3 is one example. Imaging element 80, for example, may be a reflective imaging element such as a digital micromirror device (DMD) or a reflective liquid crystal panel. In addition, a three-plate optical system may be used in projection image display apparatus 200.

Other Embodiments

Although Embodiments 1 to 3 have been described thus far, the present disclosure is not limited to the above-described embodiments.

For example, although the laser light source has been described as a semiconductor laser in the above-described embodiments, the laser light source may be a laser other than the semiconductor laser. The laser light source may be, for example, a solid-state laser such as a YAG laser, a liquid laser such as a pigment laser, or a gas laser such as an Ar ion laser, a He—Cd laser, a nitrogen laser, or an excimer laser. In addition, the light source device may include a plurality of laser light sources.

Furthermore, the light source device may include a solid-state light emitting element other than the semiconductor laser, such as an LED light source, an organic electro luminescence (EL) element, or an inorganic EL element, as the excitation light source. In other words, the excitation light is not limited to laser light.

In addition, although the wavelength conversion device emits white light with the combination of blue laser light emitted to the wavelength conversion device and a yellow phosphor particle or a green phosphor particle according to the above-described embodiments, the configuration for emitting white light is not limited to this configuration. For example, ultraviolet laser light may be used instead of blue laser light.

In addition, the phosphor particle contained in the phosphor layer is not limited to an inorganic phosphor particle such as a YAG phosphor or a LuAG phosphor, and may be a quantum dot phosphor particle or the like.

In addition, the layered structure illustrated in the schematic cross-sectional view of the wavelength conversion device according to the above-described embodiments is one example. A wavelength conversion device having any other layered structure capable of implementing a characteristic function of the present disclosure is also included in the present disclosure. For example, another layer may be disposed between the layers of the layered structure described in the forgoing embodiments, to the extent that functions equivalent to the functions of the layered structure described in the forgoing embodiments can be implemented.

In addition, according to the foregoing embodiments, although main materials included in the layers of the layered structure of the wavelength conversion device are exemplified, each of the layers of the layered structure of the wavelength conversion device may include other materials, to the extent that functions equivalent to the functions of the layered structure described in the forgoing embodiments can be implemented.

It should be noted that the present disclosure also includes other forms in which various modifications apparent to those skilled in the art are applied to the embodiments and the variations, or forms in which structural elements and functions in the embodiments are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A wavelength conversion device, comprising:
  a light-transmissive substrate that includes an incidence surface and an emission surface opposite the incidence surface, the light-transmissive substrate being configured to receive, by the incidence surface, excitation light and emit, from the emission surface, the excitation light; and
  a phosphor layer configured to emit fluorescent light when excited by the excitation light emitted from the emission surface, wherein
  the phosphor layer includes a first phosphor layer and a second phosphor layer, the first phosphor layer including first phosphor particles, the second phosphor layer including second phosphor particles configured to emit fluorescent light including a peak wavelength longer than a peak wavelength of fluorescent light emitted by the first phosphor particles, the refractive index of the first phosphor layer being different from the refractive index of the second phosphor layer, in the first phosphor layer, each of the first phosphor particles is in direct contact with at least one of the other first phosphor particles, and in the second phosphor layer, each of the second phosphor particles is in direct contact with at least one of the other second phosphor particles, wherein some of the first phosphor particles in the first phosphor layer are in direct contact with at least one of the second phosphor particles in the second phosphor layer.

2. The wavelength conversion device according to claim 1, wherein the second phosphor layer is between the first phosphor layer and the emission surface.

3. The wavelength conversion device according to claim 1, wherein the first phosphor layer and the second phosphor layer are disposed side by side along the emission surface.

4. The wavelength conversion device according to claim 3, wherein the first phosphor layer comprises a plurality of first phosphor layers and the second phosphor layer comprises a plurality of second phosphor layers, the plurality of first phosphor layers and the plurality of second phosphor layers are disposed in a matrix along the emission surface, and the plurality of first phosphor layers and the plurality of second phosphor layers are alternately disposed in each of a column direction and a row direction in the matrix.

5. The wavelength conversion device according to claim 1, wherein the refractive index of the first phosphor layer is less than the refractive index of the second phosphor layer.

6. The wavelength conversion device according to claim 1, wherein the refractive index of the first phosphor layer is greater than the refractive index of the second phosphor layer.

7. The wavelength conversion device according to claim 1, further comprising:

an optical thin film between the emission surface and the phosphor layer, the optical thin film having a property of transmitting the excitation light and reflecting the fluorescent light.

8. The wavelength conversion device according to claim 1, wherein the phosphor layer includes a base material, and contains the first phosphor particles and the second phosphor particles in a volume of at least 40% relative to the base material.

9. A light source device, comprising:

the wavelength conversion device according to claim 1; and an excitation light source that emits the excitation light received by the incidence surface.

10. A lighting apparatus, comprising:

the light source device according to claim 9; and an optical component that condenses or diffuses light emitted by the light source device.

11. A projection image display apparatus, comprising:

the light source device according to claim 9;

an imaging element that modulates light emitted by the light source device, and outputs modulated light as an image; and a projection lens that projects the image output by the imaging element.

12. A projection image display apparatus, comprising:

the light source device according to claim 9;

a transmissive panel that modulates light emitted by the light source device, and outputs modulated light as an image; and a projection lens that projects the image output by the transmissive panel.

13. The wavelength conversion device according to claim 1, wherein the first phosphor layer is formed by sintering the first phosphor particles, and the second phosphor layer is formed by sintering the second phosphor particles.

* * * * *